United States Patent Office 3,299,347
Patented Jan. 17, 1967

3,299,347
STARTING DEVICE FOR GRADUALLY APPLYING CURRENT TO A LOAD BY MEANS OF PARALLEL BRANCH CIRCUITS
Yasunosuke Torii, Musashino-shi, Tokyo, Japan, assignor to Tokyo Shibaura Electric Co., Ltd., Kawasaki-shi, Japan, a corporation of Japan
Filed Mar. 27, 1964, Ser. No. 355,247
Claims priority, application Japan, Mar. 29, 1963, 38/16,015
4 Claims. (Cl. 323—97)

This invention relates to starting resistance devices and more particularly to starting resistance devices for use in starting and accelerating D.C. motors for driving electric vehicles so as to decrease the number of rectifier elements used in such devices as switching means.

Generally speaking, the present invention provides for a starting device for gradually applying current to a load. The device has a main resistor, a plurality of branch circuits, each of the branch circuits including a plurality of resistors connected in series and a controlled rectifier element which when enabled will pass current across the respective branch. Across all of the resistors in each branch, less one, there is a shunt circuit including a second controlled rectifier element. Means are provided to sequentially enable the first mentioned controlled rectifier elements in the respective branch circuits concurrently with the simultaneously enabling of a selected one of the second controlled rectifier elements, so as to short circuit the series resistors across which these second controlled rectifier elements are shunted.

Figure 1:
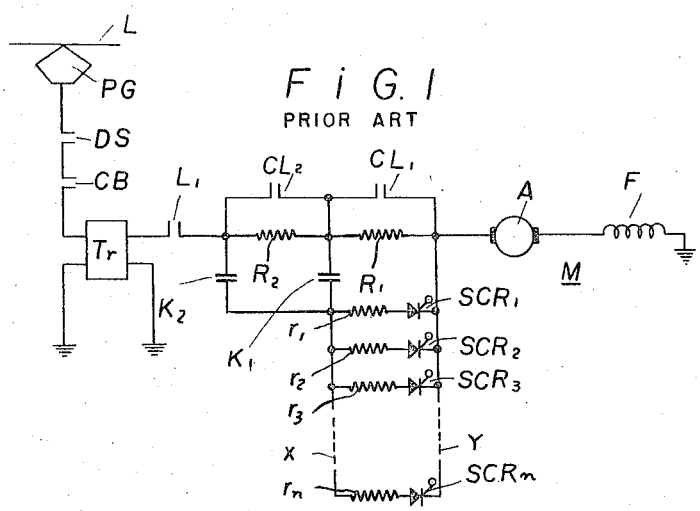
Figure 2:
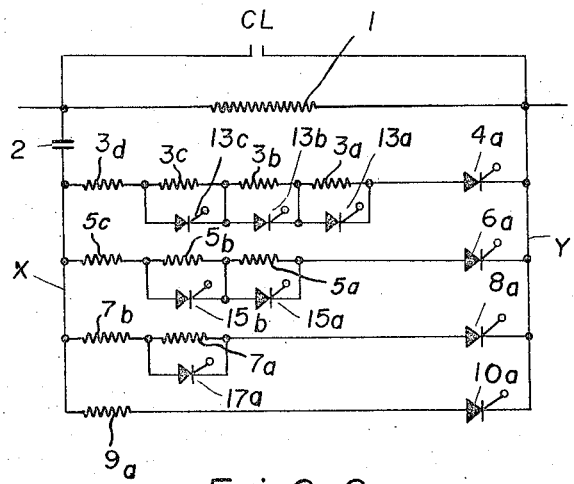

The invention will be better understood from the following description taken in connection with the accompanying drawing; in which FIG. 1 represents a circut diagram of a typical starting resistance device utilizing silicon controlled rectifiers as the switching elements; and FIG. 2 represents a circuit diagram of the essential portion of one embodiment of this invention.

Referring now to the accompanying drawing, more particularly to FIG. 1, there is shown a typical starting resistance device for use in electric vehicles wherein silicon controlled rectifier elements are used to vary resistance value. More particularly one terminal of an electric converter Tr comprising a step down transformer and a rectifier is connected to an A.C. overhead trolley wire L through a pantograph PG, a disconnecting switch DS and a circuit breaker CB and the opposite terminal is grounded. One of the output terminals of the converter is directly grounded while the other output terminal is grounded through a line contactor $L_1$, resistors $R_1$ and $R_2$, an armature A and a series field F of a D.C. series motor M. Contactors $CL_2$ and $CL_1$ are connected across the respective sections of the resistors $R_2$ and $R_1$. One terminal of the resistor $R_1$ is connected to a bus bar X through a contactor $K_1$ whereas the other terminal is connected directly to a bus bar Y and a number of control resistors $r_1, r_2, r_3 \ldots r_n$ are connected across these bus bars via respective controlled rectifier elements such as silicon controlled rectifier elements $SCR_1, SCR_2, SCR_3 \ldots SCR_n$. A contactor $K_2$ is connected in series with the contactor $K_1$ across the resistor $R_2$.

When the line contactor $L_1$ is closed, current will be supplied to the D.C. motor from the trolley wire L through pantograph PG, resistors $R_2$ and $R_1$ and through the armature A and field winding F of the motor M to start it. As the number of revolutions of the motor is increased the contactor $K_1$ is closed and the control resistor $r_1$ is connected in parallel with the resistor $R_1$ through the control rectifier element $SCR_1$. When the current flowing through the motor is decreased to a predetermined value the next control resistor $r_2$ will be connected with resistors $R_1$ and $r_1$ through the control rectifier element $SCR_2$ under the control of a current limiting relay, not shown. Similarly succeeding control resistors $r_3 \ldots r_n$ are sequentially added in parallel to decrease the value of resistance in circuit with the motor M.

Then the contactor $CL_1$ is closed to short circuit all of the resistors $R_1$ and $r_1, r_2, r_3 \ldots r_n$ to automatically turn off all controlled rectifier elements $SCR_1$ to $SCR_n$ inclusive and to pass current to the motor M through the line contactor $L_1$ and the second resistor $R_2$. Then the contactor $K_1$ is opened and the contactor $K_2$ closed to connect bus bars X and Y across the resistor $R_2$. Thereafter control resistors $r_1, r_2, r_3 \ldots r_n$ are sequentially connected in parallel with the resistor $R_2$ and finally the contactor $CL_2$ is closed to completely cut out all resistors from the motor circuit.

With this arrangement if it is required to control the circuit to pass $\frac{1}{5}$ of the starting current through the control resistor $r_1$ the value of the resistor $r_1$ should be four times as large as that of the resistor $R_1$. As a result the resistance value will be changed from $R_1$ to $\frac{4}{5} R_1$ so that the amount of change of resistance value is equal to $\frac{1}{5} R_1$.

In order to assure equal current division among various resistors $r_1, r_2, r_3 \ldots r_n$ when they are connected in parallel, a relation that $r_1=r_2=r_3 \ldots r_n=4R_1$ should be satisfied. This is the condition to assure equal current division among remaining resistors and hence to prevent heavy current from flowing through a particular resistor, should one resistor fail. When the values of respective resistors are selected to satisfy the above mentioned relation, the change in the value of the resultant resistance should also be equal to $\frac{1}{5} R_1$ when the contactor $CL_1$ is turned on. Should the change in the resistance value be larger than this particular value, the change in resistance value when the controlled rectifier element $SCR_n$ is turned on will be larger than that when the controlled rectifier element $SCR_1$ is closed. To provide a resultant resistance value of $\frac{1}{5} R_1$ bp connecting in parallel a number of resistors, each having a resistance value of $4R_1$ it is necessary to connect $4 \times 4 = 16$ resistors, each having a resistance value of $4R_1$, in parallel with the resistor $R_1$. Accordingly it is necessary to utilize 16 relatively expensive control rectifier elements. Generally stated, $(N-1)^2$ control rectifier elements are required to provide a resistance change of $1/N$, and it is well known that the number of N should be increased in order to have smooth acceleration of electric vehicles.

Accordingly the object of this invention is to decrease the number of relatively expensive control rectifying elements when compared with the prior arrangement shown in FIG. 1 without decreasing the number of steps of varying the resistance value.

One embodiment of this invention will now be described by referring to FIG. 2 of the accompanying drawing. FIG. 2 shows only the starting resistance device since the remainder of the motor control circuit is identical with that shown in FIG. 1. One terminal of a main resistor 1 having a value of $R_1$ is connected to a bus bar X and the opposite terminal directly to the other bus bar Y. Across these bus bars X and Y is connected a first branch comprising four serially connected resistors $3a$, $3b$, $3c$ and $3d$ and a controlled rectifier element $4a$. A second branch comprising three serially connected resistors $5a$, $5b$ and $5c$ and a controlled rectifier element $6a$, a third branch comprising two serially connected resistors $7a$ and $7b$ and a controlled rectifier element $8a$ and a fourth branch comprising a resistor $9a$ and a control rectifier element $10a$ are also connected across the bus bars. Resistors $3a$, $3b$ and $3c$ are shunted by controlled rectifier elements $13a$, $13b$ and $13c$, respectively, and resistors 5a, 5b and 7a are similarly shunted by controlled rectifier elements 15a, 15b and 17a respectively. It is to be understood that all resistors included in the respective branch circuits have the same resistance value $R_1$ as the main resistor 1.

In operation the contactor 2 is firstly closed and then the controlled rectifier element 4a is turned on to pass current through four serially connected resistors 3a, 3b, 3c and 3d in parallel with the main resistor 1. Then, controlled rectifier element 6a is turned on to pass current through the second branch including resistors 5a, 5b and 5c in parallel with the main resistor 1 simultaneously with the enabling of controlled rectifier 13a in parallel across resistor 3a to short circuit resistor 3a to provide a resultant resistance of $3/5 R_1$.

In the next step, controlled rectifier 8a, which is in series with resistors 7a, 7b; rectifier 13b, which is in parallel with resistor 3b; and, rectifier 15a, which is in parallel with resistor 5a are turned on. The third branch with resistors 7a and 7b then passes current concurrently with the short circuiting of resistors 3b and 5a to reduce the resultant resistance value to $2/5 R_1$. Similarly the controlled rectifier element 10a is turned on to connect the fourth branch including the resistor 9a in parallel with the main resistor 1 simultaneously with the turning on of the controlled rectifier element 13c, in parallel with resistor 3c; 15b, in parallel with resistor 5b; and 17a in parallel with resistor 7a to short circuit resistors 3c, 5b and 7a, thus reducing the resultant resistance to $1/5 R_1$.

Thus when the controlled rectifier elements 4a, 6a, 8a and 10a are turned on sequentially, the value of the resultant resistance is sequentially decreased to $4/5 R_1$, $3/5 R_1$, $2/5 R_1$ and $1/5 R_1$, respectively. It is noted that the values of resistance of the respective branch circuits are $4R_1$, $3R_1$, $2R_1$ and $R_1$, so that current is divided into equal amounts among these parallel branch circuits. Finally a contactor CL is closed to entirely cut out resistors from the motor circuit. The total number of controlled rectifier elements required for the embodiment shown in FIG. 2 is 10 which is six less than that required for the prior arrangement shown in FIG. 1. Generally where the variation of resistance is selected to be equal to $1/N R_1$ then the number of controlled rectifier element required for carrying out this invention is represented by a formula $$(N-1) + \frac{(N-1)(N-2)}{2} = \frac{N}{2}(N-1)$$

When this formula is compared with the above-mentioned equation $(N-1)^2$, it is obvious that the number of controlled rectifier elements used can be greatly reduced.

In addition, in the arrangement shown in FIG. 2, the reverse breakdown voltage as well as the forward breakdown voltage of the controlled rectifier elements 13a, 13b, 13c, 15a, 15b and 17a may be smaller than those of the controlled rectifier elements 4a, 6a, 8a, and 10a. Accordingly the starting resistance device shown in FIG. 2 is far more economical and of light weight than the prior arrangement shown in FIG. 1.

As can be easily understood the invention provides an improved starting resistance device which can greatly reduce the number of controlled rectifier elements.

While in the above description this invention has been illustrated and described in connection with the application of this invention to the starting and acceleration of an electric motor for driving an electric vehicle, it should be understood that the invention is not limited to the particular application and that various changes and modifications can be made therein without departing from the true spirit and scope of the invention as defined in the appended claims. For example the starting resistance device of this invention may be used to start or control the speed of any D.C. motor and any type of controlled rectifier element other than the silicon controlled rectifier element may be employed.

What is claimed is:

1. A starting device for gradually applying current to a load comprising a main resistor, a plurality of branch circuits, each said branch circuits including a plurality of resistors connected in series, and a first controlled rectifier element, which when enabled will pass current across the respective branches, said main resistor and each of the resistors in said branch circuits having substantially the same resistance value;

a shunt circuit across each of said resistors less one in each of said branches, including a second controlled rectifier element in each of said shunt circuits; and, means to sequentially enable said first controlled rectifier elements in the respective branch circuits concurrently with the simultaneously enabling of a selected one of said second controlled rectifier elements to progressively short circuit the series resistors in each branch across which said second controlled rectifier elements are shunted as current passes across succeeding branches.

2. The starting device according to claim 1 wherein each of the serially connected resistors in each of said branch circuits is individually shunted by a controlled rectifier element except one resistor.

3. The starting resistance device according to claim 1 wherein a contactor is provided to short circuit said main resistor as well as all of said branch circuits.

4. A device as claimed in claim 1, the number of resistors in each branch progressively decreasing by one, there being a final stage branch having only one resistor and one controlled rectifier.

References Cited by the Examiner

UNITED STATES PATENTS 3,100,268  8/1963  Foote.

FOREIGN PATENTS 913,978  12/1962  Great Britain.

JOHN F. COUCH, *Primary Examiner.*

A. D. PELLINEN, *Assistant Examiner.*